United States Patent
Horvitz et al.

(10) Patent No.: US 9,317,834 B2
(45) Date of Patent: Apr. 19, 2016

(54) USER COMPUTING DEVICE WITH PERSONAL AGENT PROGRAM FOR RECOMMENDING MEETING A FRIEND AT A SERVICE LOCATION BASED ON CURRENT LOCATION, TRAVEL DIRECTION, AND CALENDAR ACTIVITY

(75) Inventors: Eric Horvitz, Kirkland, WA (US);
Stelios Paparizos, San Jose, CA (US);
Roger Barga, Bellevue, WA (US); Doug Burger, Bellevue, WA (US); Vinay Gupta, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 32 days.

(21) Appl. No.: 13/174,252

(22) Filed: Jun. 30, 2011

(65) Prior Publication Data
US 2013/0006904 A1 Jan. 3, 2013

(51) Int. Cl.
*G06Q 10/10* (2012.01)
*G06N 5/04* (2006.01)
(Continued)

(52) U.S. Cl.
CPC ............ *G06Q 10/10* (2013.01); *G01C 21/3679* (2013.01); *G06N 5/04* (2013.01); *G06Q 30/02* (2013.01); *G06N 99/005* (2013.01)

(58) Field of Classification Search
CPC ............................. G06N 5/04; G06N 99/005
USPC .......................................................... 706/46
See application file for complete search history.

(56) References Cited

U.S. PATENT DOCUMENTS 6,381,597 B1  4/2002 Lin
6,636,836 B1 10/2003 Pyo
(Continued)

FOREIGN PATENT DOCUMENTS

CN    101446959 A    6/2009
CN    101916264 A   12/2010
(Continued)

OTHER PUBLICATIONS

Nauman et al. Apex: Extending Android Permission Model and Enforcement with User-Defined Runtime Contraints. ASIACCS'10, pp. 328-332, Apr. 13-16, 2010.*
(Continued)

*Primary Examiner* — Stanley K Hill
*Assistant Examiner* — Robert H Bejcek, II
(74) *Attorney, Agent, or Firm* — Aneesh Mehta; Kate Drakos; Micky Minhas

(57) ABSTRACT

A long-term personal agent program, executable as network service and/or on one or more user computing devices and related method for identifying opportunities and making recommendations on behalf of one or more users, are disclosed herein. In one example, the personal agent program includes a monitoring engine configured to monitor and interpret a user's activities over time with a plurality of sensing and logging methodologies according to user authorization, the use of statistical methods for learning to understand a user's goals and behavioral patterns from data, and the use of procedures for computing the expected value of information guiding sensing and logging in different contexts. The personal agent further may include a recommendation methodology configured to make suggestions and to take actions on behalf of the user, in the present moment as well as for future times, based on inferences about user goals and opportunities in the world.

15 Claims, 7 Drawing Sheets

(51) Int. Cl.
*G01C 21/36* (2006.01)
*G06Q 30/02* (2012.01)
*G06N 99/00* (2010.01)

(56) References Cited

U.S. PATENT DOCUMENTS

| | | | |
|---|---|---|---|
| 6,868,392 B1 | 3/2005 | Ogasawara | |
| 7,386,477 B2 | 6/2008 | Fano | |
| 7,847,699 B2 | 12/2010 | Lee et al. | |
| 7,984,006 B2 * | 7/2011 | Price | 706/46 |
| 2002/0188589 A1 | 12/2002 | Salmenkaita et al. | |
| 2008/0065741 A1 | 3/2008 | Stratton et al. | |
| 2008/0114713 A1 | 5/2008 | Gray | |
| 2008/0227440 A1 * | 9/2008 | Settepalli | 455/418 |
| 2008/0249969 A1 * | 10/2008 | Tsui et al. | 706/46 |
| 2009/0112608 A1 | 4/2009 | Abu-Hakima et al. | |
| 2009/0204600 A1 * | 8/2009 | Kalik et al. | 707/5 |
| 2009/0298480 A1 * | 12/2009 | Khambete et al. | 455/414.1 |
| 2010/0049585 A1 | 2/2010 | McIntyre et al. | |
| 2010/0070380 A1 | 3/2010 | Park et al. | |
| 2010/0106678 A1 | 4/2010 | Pietrek et al. | |
| 2010/0279667 A1 * | 11/2010 | Wehrs et al. | 455/414.1 |
| 2010/0318422 A1 | 12/2010 | Kim et al. | |
| 2011/0071865 A1 | 3/2011 | Leeds et al. | |
| 2011/0125678 A1 | 5/2011 | Partridge | |
| 2012/0246684 A1 * | 9/2012 | Yarvis et al. | 725/60 |

FOREIGN PATENT DOCUMENTS

| | | |
|---|---|---|
| CN | 102043793 A | 5/2011 |
| CN | 102077182 A | 5/2011 |
| WO | 2010141656 A1 | 12/2010 |
| WO | 2011075119 A1 | 6/2011 |

OTHER PUBLICATIONS

Angryk, et al., "Development of a Travel Support System Based on Intelligent Agent Technology", Retrieved at <<http://www.ibspan.waw.pl/~paprzyck/mp/cvr/research/PIONEER_2001.pdf>>, 2001, pp. 10.
Etzioni, et al., "Intelligent Agents on the Internet: Fact, Fiction, and Forecast", Retrieved at <<http://citeseerx.ist.psu.edu/viewdoc/download?doi=10.1.1.81.3800&rep=rep1&type=pdf>>, Journal of IEEE Expert: Intelligent Systems and Their Applications, vol. 10 No. 4, May 30, 1995, pp. 14.
Hermans, Bjorn., "Intelligent Software Agents on the Internet: An Inventory of Currently Offered Functionality in the Information Society & A Prediction of (Near-) Future Developments", Retrieved at <<http://www.damaranke.co.uk/bibliography/Her96.doc>>, Jul. 9, 1996, pp. 1-88.
Miao, et al., "A Cognitive Approach for Agent-Based Personalized Recommendation", Retrieved at <<http://citeseerx.ist.psu.edu/viewdock/download?doi=10.1.1.141.540&rep=rep1&type=pdf>>, Journal of Knowledge-Based Systems, vol. 20, No. 4, Jun. 3, 2006, pp. 397-405.
E. Horvitz and P. Koch. Mobile Opportunistic Planning: Methods and Models. Proceedings of the Eleventh Conference on User Modeling (UM 2005), Jun. 2007, Corfu, Greece, pp. 238-247.
E. Kamar, E. Horvitz, C. Meek. Mobile Opportunistic Commerce: Mechanisms, Architecture, and Application, Proceedings of AAMAS 2008, Estoril, Portugal, May 2008.
A. Kapoor and E. Horvitz. Principles of Lifelong Learning for Predictive User Modeling. Proceedings of the Eleventh Conference on User Modeling (UM 2005), Jun. 2007, Corfu, Greece.
E Horvitz. Machine Learning, Reasoning, and Intelligence in Daily Life: Directions and Challenges (Invited talk), Proceedings of Artificial Intelligence Techniques for Ambient Intelligence, Hyderabad, India, Jan. 2007.
E. Horvitz. Principles of Mixed-Initiative User Interfaces. Proceedings of CHI '99, ACM SIGCHI Conference on Human Factors in Computing Systems, Pittsburgh, PA, May 1999.
A. Kapoor and E. Horvitz. Experience Sampling for Building Predictive User Models: A Comparative Study, Proceedings of CHI 2008, Florence, Italy, Apr. 2008.
"International Search Report", Mailed Date: Dec. 28, 2012, Application No. PCT/US2012/042795, Filed Date: Jun. 15, 2012, pp. 9.
European Patent Office, Extended European Search Report Issued in European Patent Application No. 12803675.3, Jan. 22, 2015, 6 Pages.
The State Intellectual Property Office of China, First Office Action and Search Report Issued in Chinese Patent Application No. 201280032655.6, Sep. 6, 2015, China, 14 pages.
Taiwan Intellectual Property Office, Office Action and Search Report issued in Taiwan Patent Application No. 101116912, Jan. 4, 2016, Taiwan, 9 pages. (Submitted with translation of Search Report).

* cited by examiner

USER COMPUTING DEVICE WITH PERSONAL AGENT PROGRAM FOR RECOMMENDING MEETING A FRIEND AT A SERVICE LOCATION BASED ON CURRENT LOCATION, TRAVEL DIRECTION, AND CALENDAR ACTIVITY

BACKGROUND

Prior to the advent of wireless navigation devices, drivers on the freeway often relied upon signs that notified them of services that could be accessed at the next freeway exit. This situation could lead to inadequate planning, including multiple intense conversations in vehicles during the short interval between the notification by sign and opportunities to exit the highway efficiently, regarding whether the passengers desired to exit the freeway to access the services. With the advent of wireless navigation devices, a vehicle passenger may now input a desired service (e.g., gas station, restaurant) while traveling in the vehicle along a route, and view a list of such service locations and a distance to each along the route.

As helpful as such wireless navigational devices may be, vehicle passengers are tasked with requesting a list of services from these devices prior to receiving a list of results. To accomplish this task, a passenger has to be cognizant of the desire to utilize a service ahead of time, and has to take the time to input the service request into the navigational device. This can result in many missed opportunities to utilize services that the user would otherwise have desired to use. As one example, this realization may arise after driving by a freeway exit, and hearing a young child plaintively announce from the back seat that "I have to go to the bathroom," only to see a sign indicating "Next Exit 43 miles". This is but one example of many in which systems that necessitate that users be cognizant of their own needs in order to request information on nearby services, fail to deliver satisfactory results for the user.

SUMMARY

A personal agent program executable on a user computing device and related method for retrieving recommendations on behalf of a user are disclosed herein. In one example, the personal agent program includes a setup module configured to receive a user authorization to monitor user activity across a plurality of computer programs that are used by the user on the user computing device and/or one or more other user computing devices. The setup module is also configured to receive one or more user recommendation preferences indicating product or service recommendations that the user would like the personal agent program to retrieve from a recommendation server.

The personal agent program also includes a monitoring engine configured to monitor the user activity with the plurality of computer programs according to the user authorization. The user activity includes a detected current location of the user, and the monitoring engine is configured to learn a behavioral pattern from the user activity. The personal agent program further includes a recommendation engine configured to make an inference that a trigger condition for one or more of the user recommendation preferences will arise, based on the detected current location of the user, the behavioral pattern of the user, and one or more contextual factors. The recommendation engine is configured to send a request to the recommendation server for a recommendation for a target product or service according to the one or more user recommendation preferences. The recommendation engine is also configured to receive the recommendation from the recommendation server, and to display the recommendation on a display associated with the user computing device.

This Summary is provided to introduce a selection of concepts in a simplified form that are further described below in the Detailed Description. This Summary is not intended to identify features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
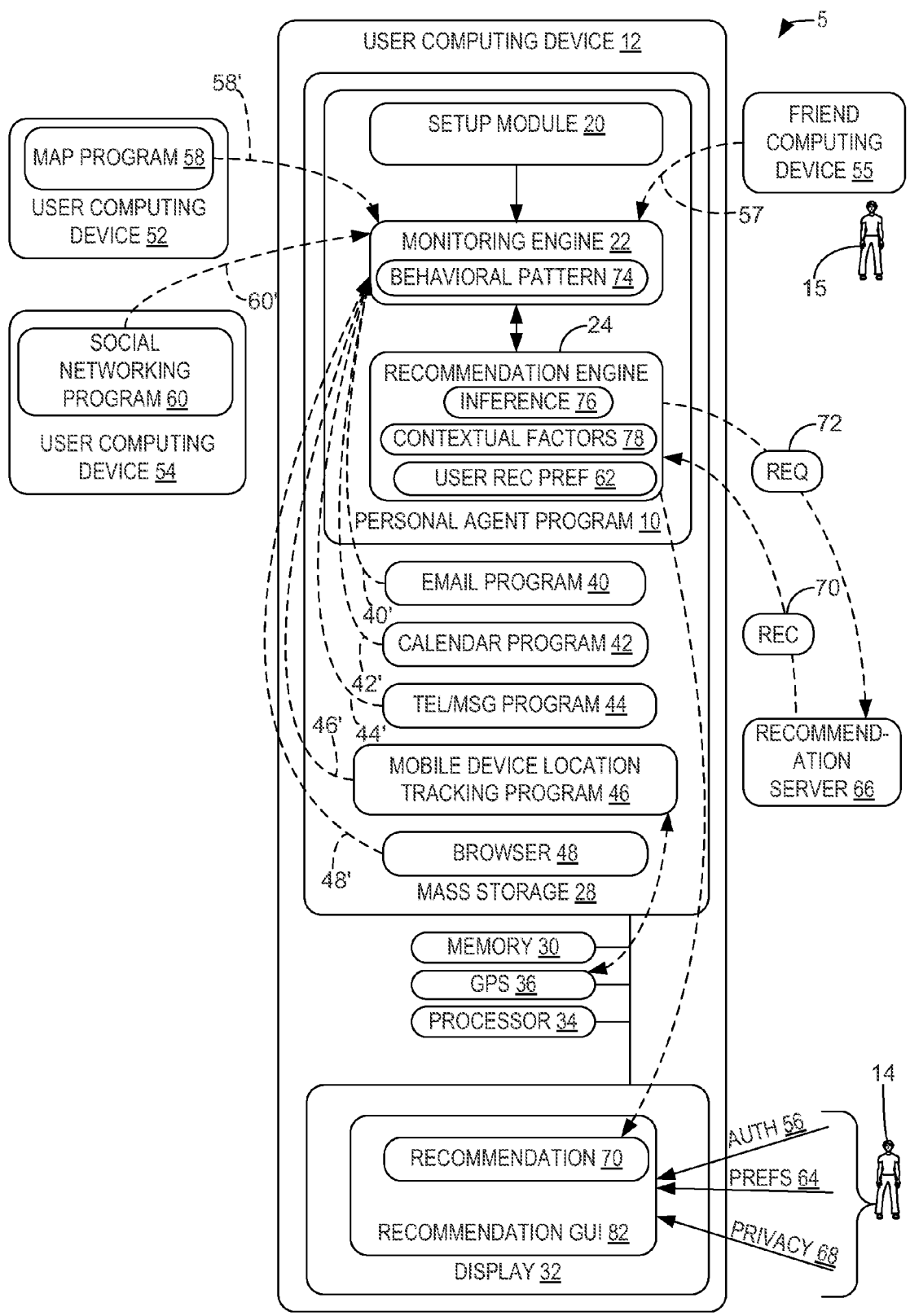
FIG. 1 shows a schematic view of one embodiment of a computer system including a personal agent program executable on a user computing device for retrieving recommendations on behalf of a user.

FIG. 1 illustrates generally one embodiment of a computing system 5 including a personal agent program 10 executable on a user computing device 12 for retrieving recommendations on behalf of a user 14. As described in more detail below, the personal agent program 10 includes a setup module 20, a monitoring engine 22, and a recommendation engine 24.

In one example, the user computing device 12 includes mass storage 28, memory 30, a display 32, a processor 34, and a location-aware technology, such as a GPS receiver 36. The GPS receiver 36 determines the location of the user computing device 12 based on the reception of satellite signals. Mass storage 28 may include the personal agent program 10 and a variety of other application programs, such as an email program. 40, a calendar program 42, a telephone/messaging program 44, a mobile device tracking program 46, and a browser 48. These programs may be executed by the processor 34 using memory 30, with output displayed on display 32, to achieve the various functions described herein. In other examples, user computing device 12 may include other components not shown in FIG. 1, such as user input devices including touch screens, keyboards, mice, game controllers, cameras, and/or microphones, for example. Further, although not shown in FIG. 1, it will be appreciated that other user computing devices 52 and 54 have similar components that function in a similar manner as described above for user computing device 12.

It will also be appreciated, as described in more detail below, that recommendations may be retrieved, user activity may be monitored, and actions may be taken on behalf of a user 14 across multiple user computing devices, such as devices 12, 52 and 54, in a device-independent manner. It will further be appreciated that this and other functionality, described below with respect to the personal agent program 10, may be executed and/or coordinated by a network-accessible service in communication with the multiple computing devices. Such a service, may, for example, provide standard sensing and interaction interfaces that enable linking and/or communicating with multiple user computing devices. Alternatively or in addition, these devices may execute agent software that provides communication protocols for monitoring user activity, making recommendations and taking actions on behalf of a user.

The process by which the personal agent program 10 retrieves recommendations on behalf of a user will now be described. In one example, the setup module 20 is configured to receive a user authorization 56 from user 14, via a recommendation graphical user interface (e.g., GUI) 82 displayed on the display 32 of the user computing device 12. The user authorization 56 authorizes the personal agent program 10 to monitor user activity across a plurality of computer programs used by the user on the user computing device 12 and/or one or more other user computing devices, such as user computing device 52 and user computing device 54. An example of a computer program used on the user computing device 52 may be a map program 58. An example of a computer program used on the computing device 54 may be a social networking program 60. It will be appreciated that the use of these programs on user computing devices 52, 54 is merely an example, and these programs 58, 60 may instead or in addition be used on user computing device 12. Further, the various computer programs identified above, including but not limited to email program 40, calendar program 42, telephone/messaging program 44, mobile device tracking program 46, and browser 48, may be used by the user on the computing device 12, and/or other user computing devices 52, 54.

The monitoring engine 22 is configured to monitor the user activity with the plurality of computer programs according to the user authorization 56. In FIG. 1, user activity in the email program 40 is indicated by dashed line 40', user activity in the calendar program 42 is indicated by dashed line 42', user activity across the telephone/messaging program 44 is indicated by dashed line 44', user activity in the mobile device location tracking program 46 is indicated by dashed line 46', user activity in the browser 48 is indicated by dashed line 48', user activity in the map program 58 is indicated by dashed line 58', and user activity in the social networking program 60 is indicated by dashed line 60'. The user activity may include a detected current location of the user 14, which may be detected by the mobile device location tracking program 46 using GPS or other suitable tracking technologies.

Upon receiving the appropriate authorizations, the monitoring engine 22 may also be configured to monitor friend activity 57 in various programs executed on a friend computing device 55 used by a friend 15 of the user 14. Although not shown in FIG. 1, it will be appreciated that the friend computing device 55 may have similar components and programs that function in a similar manner as described above for user computing devices 12, 52 and 54. For example, the monitoring engine 22 may monitor friend activity 57 in a calendar program, a mobile device location tracking program and a social networking program that are executed on the friend computing device 55.

In one example that is described in more detail below, the monitoring engine 22 may monitor user activity 46' in the mobile device location tracking program 46 of the user computing device 12 and friend activity 57 in a mobile device tracking program in friend device 55 to determine that the user 14 and friend 15 are traveling in directional trajectories that will intersect at an intersecting location. The monitoring engine 22 may also monitor user activity 42' in the calendar program 42 of the user computing device 12 and friend activity 57 in a calendar program in friend device 55 to check for availability of the user 14 and friend 15 within a time period that includes an approximate time that the user 14 and friend 15 may arrive at the intersecting location.

If the user 14 and friend 15 are available during the time period, then the recommendation engine 24 is configured to request and receive from a recommendation server 66 a recommendation 70 for a target service that is provided within a threshold distance of the intersecting location. The recommendation 70 may then be displayed on display 32 of the user computing device 12. Additional description of the operation of the recommendation engine 24 is provided below. It will also be appreciated that, upon receiving the appropriate authorizations, the monitoring engine 22 may also monitor activity on computing devices that are associated with other friends, relatives, colleagues and/or acquaintances of the user 14.

The monitoring engine 22 may also be configured to dynamically monitor user activity by selectively activating or accessing at least one of the plurality of computer programs based on computing an expected value of information that may be gleaned from the user activity. In this manner, the personal agent program 10 may gain access to additional data related to user activity, and thereby enhance the program's real-time decision making capabilities and/or long-term data collection for learning predictive models, as described in more detail below.

In one example, user activity from one or more of the computer programs may be normally inaccessible due to user privacy preferences. Where the personal agent program 10 has received necessary user opt-in permissions, the monitoring engine 22 may selectively access these computer programs and monitor the user activity that otherwise would be unavailable. In another example, one or more of the computer programs may be inactive for resource considerations, such as a deactivated GPS receiver 36 for reduced power consumption, in a situation or at a time that data monitoring would otherwise be useful. Again, provided that the necessary permissions have been received, the monitoring engine 22 may selectively activate the inactive program and monitor the user activity related to that program.

The monitoring engine 22 may selectively activate or access one of the plurality of computer programs at particular times and/or locations that will likely generate useful user activity information. The monitoring engine 22 may also determine when to selectively activate or access one of the plurality of computer programs by computing an expected value of the information that may be gleaned from the user activity associated with the computer program. In one example, computing an expected value of the information may include using heuristic procedures or other experienced-based evaluations. If the resulting expected value exceeds a threshold value, then the monitoring engine 22 may selectively activate or access the otherwise inaccessible or inactive computer program.

The monitoring engine 22 may also be configured to learn a behavioral pattern 74 from the user activity in the various computer programs on the various user computing devices. In one example, the monitoring engine 22 may monitor the GPS receiver 36 to infer a user's response, or lack thereof, to a recommendation provided to the user. In one case, the monitoring engine 22 may determine that the GPS signal was lost at a particular location, due to, for example, the user entering a parking garage or turning off the computing device. If the user has just received a recommendation for a product or service provided at this location, then it may be inferred that the user has responded favorably to the recommendation.

Additionally, where the GPS receiver is later activated at the same location after a period of time, it may also be inferred that the user has been present at that location for the period of time. This information may also be used to infer user satiation. In one example, a GPS location indicates that the user has stopped at a restaurant for an amount of time, such as 1.5 hours, that indicates that a meal was likely consumed. Using this data, the recommendation engine 24 may infer how long it will be until the user may desire another meal.

While these behavioral patterns are learned from observation of activity of a particular user over time, the patterns for any particular user may be based upon and compared to aggregate behavioral patterns generated from observing an entire user population over time. Thus, the monitoring engine 22 may in one mode, learn user behavioral patterns by receiving aggregate behavioral patterns from the recommendation server 66, and examining the user activity in the various computer programs for user activity that matches the aggregate behavioral patterns within a threshold degree.

The personal agent program 10 utilizes user action histories and recommendation preferences to determine what sorts of recommendations a user might like to receive. These user recommendation preferences may be implicit, such as preferences inferred by the personal agent program itself, as indicated at 62, or may be explicit, such as preferences inputted by the user, as indicated at 64. To that end, the monitoring engine 22 may be configured to create an inferred user recommendation preference 62 based on the behavioral pattern 74, with the user recommendation preference 62 indicating product or service recommendations that the user would like the personal agent program 10 to retrieve from a recommendation server 66, as inferred by the monitoring engine 22. The setup module 20 may also be configured to receive one or more inputted user recommendation preferences 64 from the user 14 via user input into recommendation GUI 82.

In one use case example relating to an inferred user recommendation preference 62, the monitoring engine 22 may observe a behavior pattern 74 that includes user activity across a social networking program, such as social networking program 60 on user computing device 54. By observing social interactions in which the user engages, the monitoring engine 22 may infer that one or more members of the user's social graph influences certain user purchasing decisions. For example, the monitoring engine 22 may observe that the user has dined at three restaurants after receiving positive comments regarding each of the restaurants from a friend A in the user's social graph. Using this information, the monitoring engine 22 may create an inferred user recommendation preference 62 for restaurants that the user's friend A prefers or has frequented. Information regarding the restaurants that friend A prefers or has frequented may also be gathered, for example, by observing the user's activity across the social networking program, including communications involving friend A.

Additionally, the setup module 20 may be configured to receive a user privacy setting 68 from user 14 indicating a category of data that the user authorizes the personal agent program to examine. The privacy setting may also indicate whether sharing of the data is allowed with an outside server, such as recommendation server 66. Specifically, the user privacy setting 68 may indicate an examine-only category of the user activity that the user authorizes the personal agent program 10 to examine from the plurality of computer programs but not share externally, and/or a sharing-authorized category of the user activity that the user authorizes the personal agent program to send to the recommendation server 66 with a request 72 for a recommendation 70.

The recommendation engine 24 is configured to make an inference 76 that a trigger condition for one or more user recommendation preferences 62, 64 will arise, based on the detected current location of the user 14, the behavioral pattern 74 of the user, and one or more contextual factors 78 associated with current observed user activity. The trigger condition may be one or a set of defined conditions that are specified by the user directly or which are determined by the monitoring engine. As some examples, the trigger condition may comprise a predicted future location or other predicted condition of the user 14.

In another example, the recommendation engine 24 may be configured to use machine learning procedures for building predictive models for forthcoming locations of the user and the association of those locations with the user (home, office, etc.), as well as to learn preferences from the data and to identify opportunities occurring in the future in which the user may be interested. In this manner, data related to aspects of users and users' behaviors and relationships (including graphical relationships in a social graph that links users with different preferences, attributes, and behaviors), may be collected and leveraged as training and testing data for building predictive models of various types. Tools for building such models include machine learning procedures such as, for example, Bayesian structure search, Support Vector Machines, Gaussian Processes, logistic regression, and extensions to relational variants that take into consideration constraints or patterns of relationships among entities and/or properties. Examples of predictions that may be enabled by such predictive models, include a user's or group of users' preferences, future locations of a user (or present location if not observed directly), future opportunities in which a user may be interested, and user actions in the world.

In one example, a predictive model may be used to generate proposals to the user for future events that are opportunities for scheduling, and that may be coupled with commerce and advertising offers. In one case, a predictive model may identify from the calendar program 42 that next Saturday evening is available for the user. The predictive model may then generate a wonderful multistep plan for the user and his or her spouse for next Saturday evening. The plan may include, for example, a drive to a location, coupled with one or more activities, such as dinner and entertainment. The predictive model and recommendation engine 24 may also weave together one or more recommendations, offers and/or specials related to the activities and destinations. One or more of the recommendations, offers and/or specials received by the recommendation engine 24 from the recommendation server 66 may be generated according to one or more user recommendation preferences and/or the behavioral pattern of the user. In this manner, it will also be appreciated that the user activity, behavioral patterns, and other information gathered by the personal agent program 10 may be used for targeted marketing and/or advertising purposes, provided the appropriate authorizations are received from the user.

In addition to providing recommendations and as noted above, the recommendation engine 24 may also take one or more actions on behalf of the user with respect to an opportunity occurring in the future. For example, in the multistep plan for Saturday evening described above, the recommendation engine 24 may proactively make a dinner reservation for the user and his or her spouse at a restaurant near one of their proposed destinations. A message including a recommendation of the restaurant and information related to the reservation may be displayed to the user on the user computing device 12, and/or may be stored for later access via another computer program, such as the calendar program 42. In another example, the personal agent program 10 may proactively communicate with a third party service that desires to deliver an advertisement to the user in return for an incentive. In this case, the personal agent program 10 may receive and store the advertisement and the incentive, and may inform the user that it has communicated with the third party service and has downloaded the advertisement/incentive, and is ready to play the advertisement whenever the user desires.

The one or more contextual factors 78 associated with a current observed user activity describe the context in which user actions in the user activity take place. The contextual factors may include, but are not limited to, a date, a day of a week, a time of day, or a time period that the user computing device 12 has been located in a detected current location. These and other concepts will be more fully illustrated in the use case examples that follow.

Figure 2:
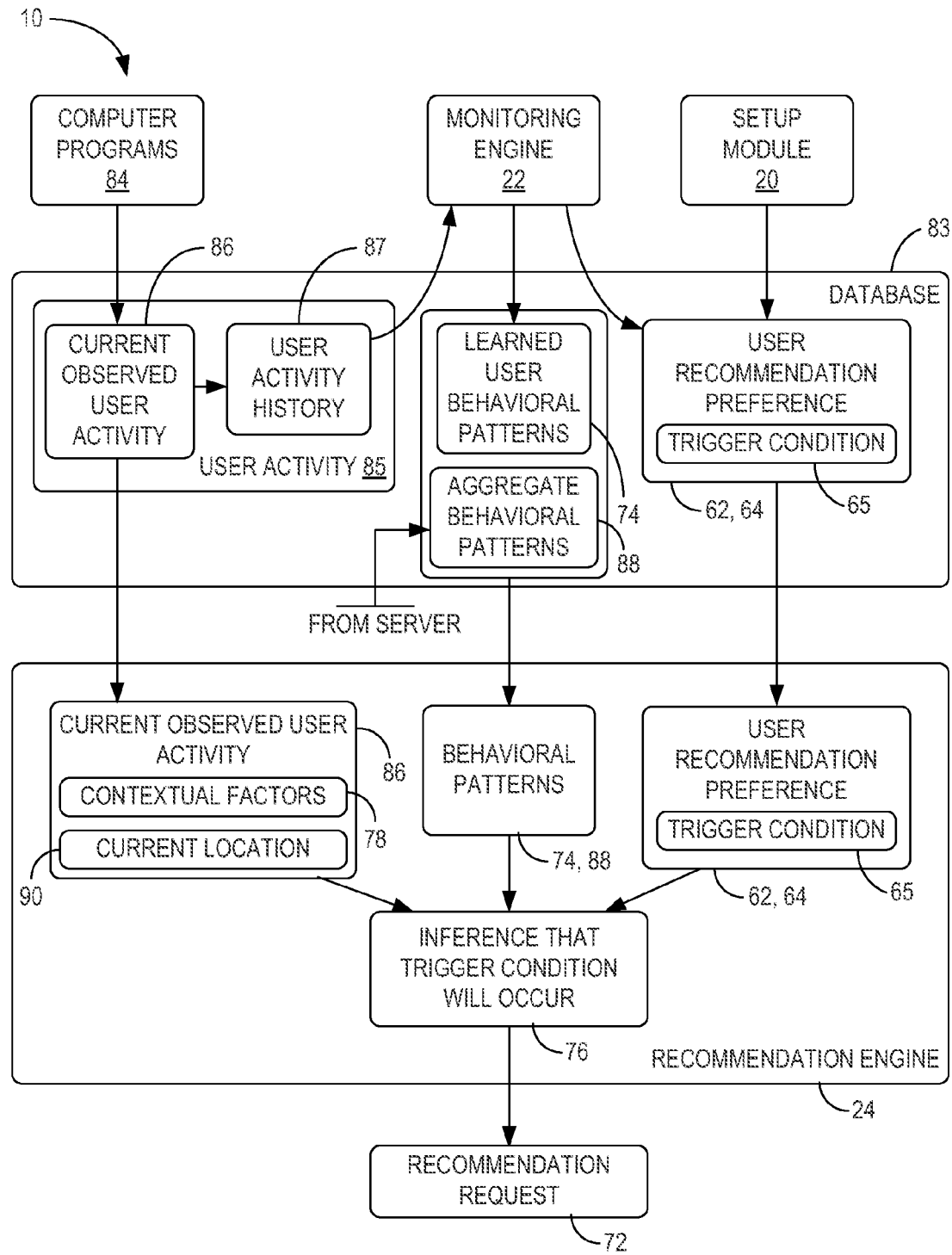
FIG. 2 is a partial detail schematic view of the personal agent program of FIG. 1, illustrating the manner in which inferences are made and recommendation requests are generated.

Turning now to FIG. 2, a manner in which inferences are made and recommendation requests are generated by the recommendation engine 24 will now be described. It will be appreciated that user activity 85 output from various computer programs 84, such programs 40-48, 58, and 60 described above in relation to FIG. 1, is saved in database 83 of personal agent program 10. User activity 85 includes a stream of current observed user activity 86, which is periodically added to a user activity history 87. The user activity history 87 is reviewed by the monitoring engine 22, described above. The monitoring engine 22 learns user behavioral patterns 74 for the user, which are also stored in database 83. Aggregate behavioral patterns 88 based on user activity of an entire user population may be downloaded from the recommendation server, and stored in database 83 as well, and used to identify learned user behavioral patterns 74, as described above. Database 83 also stores user recommendation preferences 62, 64 and their associated trigger conditions 65, which have been directly received as user input via setup module 20, or which have been inferred by from user activity 85 by monitoring engine 22.

The recommendation engine 24 receives at least a portion of the user activity 85, typically the current observed user activity 86 including a current detected location 90 of the user and contextual factors 78, such as date and time, associated with the current observed user activity. The recommendation engine 24 compares these data to behavioral patterns 74, 88 to determine whether a trigger condition 65 of the user recommendation preferences 62, 64 is likely to be met, for example, within a threshold of probability. If so, the recommendation engine makes an inference 76 that a trigger condition 65 for the user recommendation preference 62, 64 will arise.

With further reference back to FIG. 1, upon generation of the inference 76, the recommendation engine 24 is configured to send a request 72 to the recommendation server 66 for a recommendation for a target product or service according to one or more of the user recommendation preferences 62, 64, as each user recommendation preference 62, 64 typically has at least one target product or service associated with it. The recommendation engine 24 is further configured to receive a recommendation 70 related to the target product or service from the recommendation server 66, and display the recommendation 70 in the recommendation GUI 82 on the display 32 of the user computing device 12.

First Use Case Example

Figure 3:
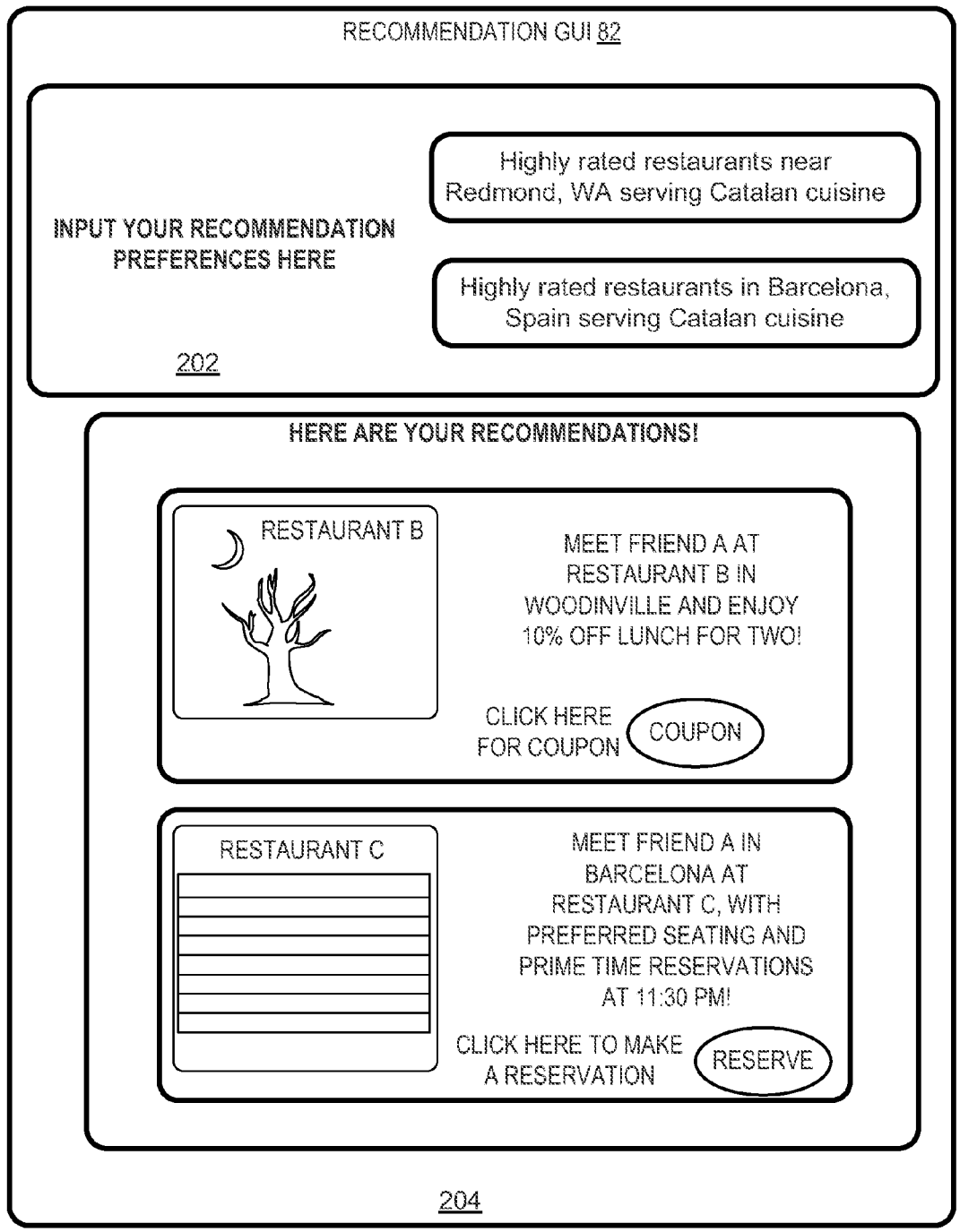
FIG. 3 is a schematic view of a first example screen of the recommendation graphical user interface shown in FIG. 1.

In one example use case, user computing device 12 is a mobile communication device and user 14 is currently detected to be in Redmond, Wash. via user activity 46' from the mobile device location tracking program 46. User 14 has notified the personal agent program 10 that the user would like to receive recommendations for highly-rated restaurants serving Catalan cuisine near Redmond, and for highly-rated restaurants serving Catalan cuisine in Barcelona, Spain. With reference now to FIG. 3, the user has previously inputted these user recommendation preferences into the user's mobile computing device 12 via a user input interface 202 within the recommendation GUI 82.

On another screen of the recommendation GUI 82, the user has also provided the personal agent program with authorization to monitor the user's calendar activity 42' in the calendar program 42, location via the location activity 46' in the mobile device location tracking program 46, browser activity 48' in the browser 48, and social networking activity 60' in a social networking program 60 that may reside on another user computing device 54. The user has also inputted user privacy settings indicating that the user's calendar activity 42' fails within an examine-only category that may not be shared externally, and that the user's location activity 46', browser activity 48', and social networking activity 60' fall within a sharing-authorized category that may be sent to a recommendation server with a request for a recommendation.

By monitoring the locations from the user's GPS-enabled mobile communication device and mobile device location tracking program 46, and user activity 42' from the calendar program 42, including user's shared calendar called "FAMILY CALENDAR", the personal agent program 10 has learned a behavioral pattern that the user has taken a 2 week family vacation each August in each of the last 3 years. It is now July, and the user has a shared calendar item from the FAMILY CALENDAR for August 2-August 16 that reads simply "BARCELONA." Additionally, by monitoring user activity 48' from the browser 48, the personal agent program 10 learns that the user recently purchased a "LEARN SPANISH" audio book from an online book provider. Based on these contextual factors, the personal agent program 10 makes an inference that the user is again planning a family trip in August, this time to Barcelona, Spain from August 2-August 16. The recommendation engine 24 in the personal agent program 10 may also create an additional user recommendation preference 62 based on this behavioral pattern, such as a preference for recommendations of international home swapping services.

By examining the user's social networking activity 60' and the user's associated social graph, the personal agent program 10 notices a posting that says "Can't wait for Barcelona trip in August" from Friend A, one of the user's friends who has a residence that is near the user's home in Redmond, Wash. Given this posting, the user's current location in Redmond, the current date, and the user's presumed vacation to Barcelona, the personal agent program 10 makes an inference that a trigger condition for a user recommendation preference for highly-rated. Catalan restaurants near Redmond may arise; namely, that the user may enjoy meeting Friend A for a meal at a Catalan restaurant near Redmond before August 2 to discuss their upcoming travels to Barcelona. The personal agent program 10 may also make another inference that the user may enjoy dining with Friend A at a Catalan restaurant in Barcelona, should they happen to be in the city at the same time.

The personal agent program 10 sends requests to a recommendation server 66 for recommendations for highly-rated restaurants serving Catalan cuisine near Redmond, and for highly-rated restaurants serving Catalan cuisine in Barcelona. The recommendations received from the recommendation server 66 are displayed in a recommendation region 204 of the recommendation GUI 82.

Second Use Case Example

Figure 4:
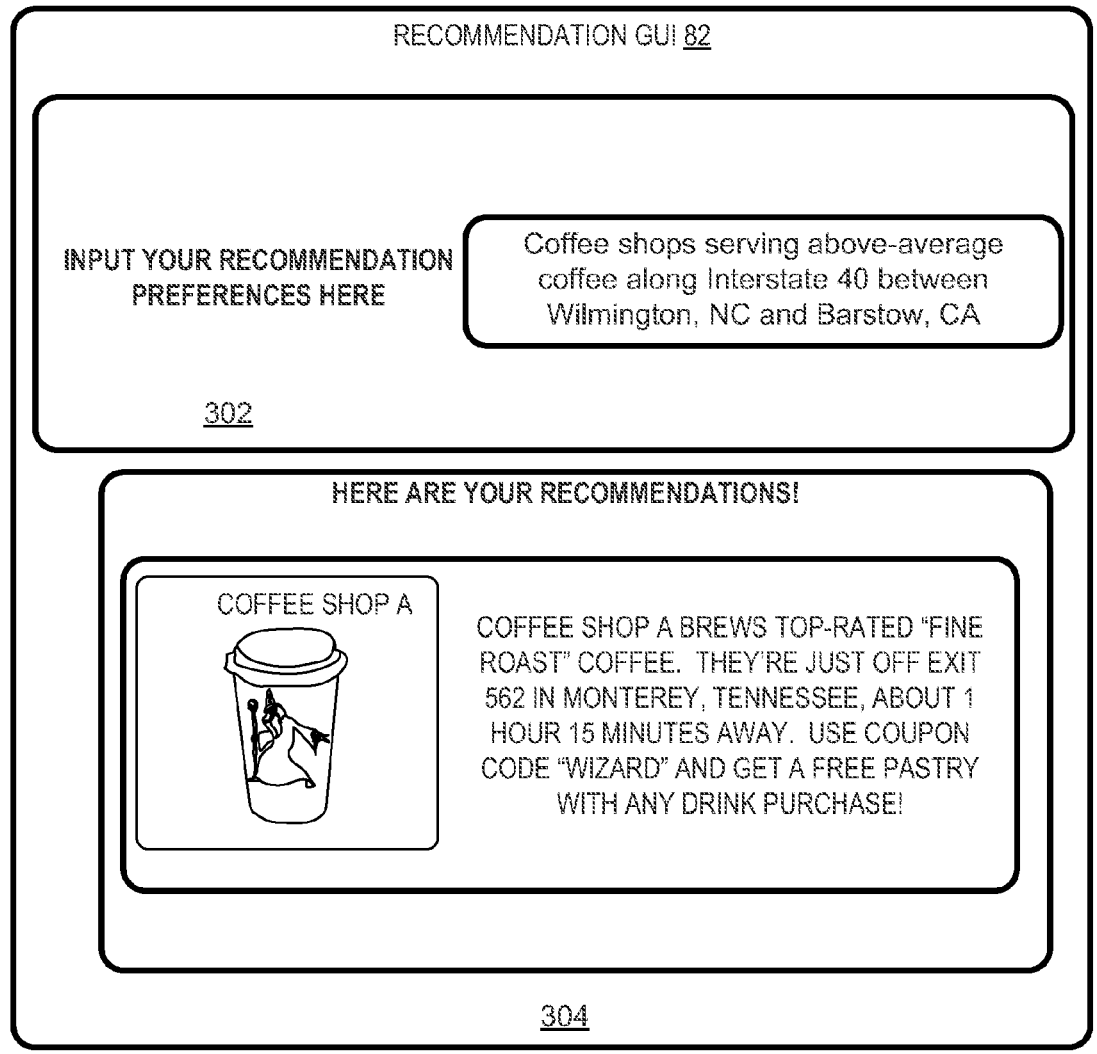
FIG. 4 is a schematic view of a second example screen of the recommendation graphical user interface shown in FIG. 1.

In another example use case, user computing device 12 is a mobile communication device and user 14 is currently detected to be at a location corresponding to the Truck Stop Diner near Knoxville, Tenn. along Interstate 40, via user activity 46' from the mobile device location tracking program 46. User 14 has notified the personal agent program 10 that the user would like to receive recommendations for coffee shops serving above-average coffee along I-40 between Wilmington, N.C. and Barstow, Calif. With reference now to FIG. 4, the user has previously inputted this user recommendation preference into the user's mobile communication device via a user input interface 302 within the recommendation GUI 82.

On another screen of the recommendation GUI 82, the user has also provided the personal agent program with authorization to monitor the user's calendar activity 42' in the calendar program 42, location via the location activity 46' in the mobile device location tracking program 46, browser activity 48' in the browser 48, email activity 40' in the email program 40, phone call activity 44' in a telephone/messaging program 44, and map activity 58' in a map program 58 that resides on another user computing device 52, such as a navigation system. The user has also inputted user privacy settings indicating that the user's email activity 40' and phone call activity 44' fall within an examine-only category that may not be shared externally, and that the user's calendar activity 42', location activity 46', browser activity 48', and map activity 58' fall within a sharing-authorized category that may be sent to a recommendation server with a request for a recommendation.

By monitoring the locations from the user's GPS-enabled mobile communication device and mobile device location tracking program 46, the personal agent program 10 learns that the user began driving 8 hours ago from the user's residence in Myrtle Grove, N.C. and has been traveling west on Interstate 40. The personal agent program 10 also notices a shared calendar item dated today on the user's calendar that reads "L.A. TRIP," Additionally, 8 hours ago the user requested a routing from Myrtle Grove, N.C. to Los Angeles, Calif. from the map program 58 on the navigation system. Based on these contextual factors, the personal agent program 10 makes an inference that the user is driving from Myrtle Grove, N.C. to Los Angeles along I-40.

The personal agent program notes that the current time is 12:52 pm, the user has just begun driving west on I-40, and the user's location remained at the Truck Stop Diner for the previous 47 minutes. Given the user's presence at this restaurant for 47 minutes over the lunch hour, suggesting that the user has just eaten lunch, and the inference that the user will continue driving west on I-40, the personal agent program 10 makes another inference that a trigger condition for the user's recommendation preference for excellent coffee along I-40 may arise; namely, that the user may enjoy stopping for coffee in approximately 1 hour and 15 minutes, which corresponds to a predicted future location that is approximately 83 miles from the user's current location based on the user's average driving speed on I-40 during this trip. In making the inference that the user may enjoy stopping for coffee near this location, the personal agent program 10 may also utilize related machine learnings of user behaviors under a variety of conditions over an entire user population. These machine learnings suggest that users traveling along freeways on average stop for a coffee or rest break 1 hour and 20 minutes after eating lunch.

The personal agent program 10 sends requests to a recommendation server 66 for recommendations for coffee shops serving above-average coffee along I-40 and preferably approximately 83 miles from the user's present location. The recommendation server returns a recommendation for Coffee Shop A in Monterey, Tenn. Monterey, Tenn. is approximately 88 miles from the user's current location. The recommendation received from the recommendation server 66 is displayed in a recommendation region 304 of the recommendation GUT 82.

The personal agent program 10 may also apply a rule that provides a suggestion to the user that the user take a rest or coffee break when the user has been driving on a freeway without a stop for at least 2 hours. In the present example, if the user does not stop at Coffee Shop A and is still driving 2 hours after their lunch break, the personal agent program 10 may send a request to the recommendation server 66 for recommendations for coffee shops serving above-average coffee near the current location of the user or the user's expected route on I-40. The rule may be preset in the personal agent program 10 or may be input by the user.

Third Use Case Example

Figure 5:
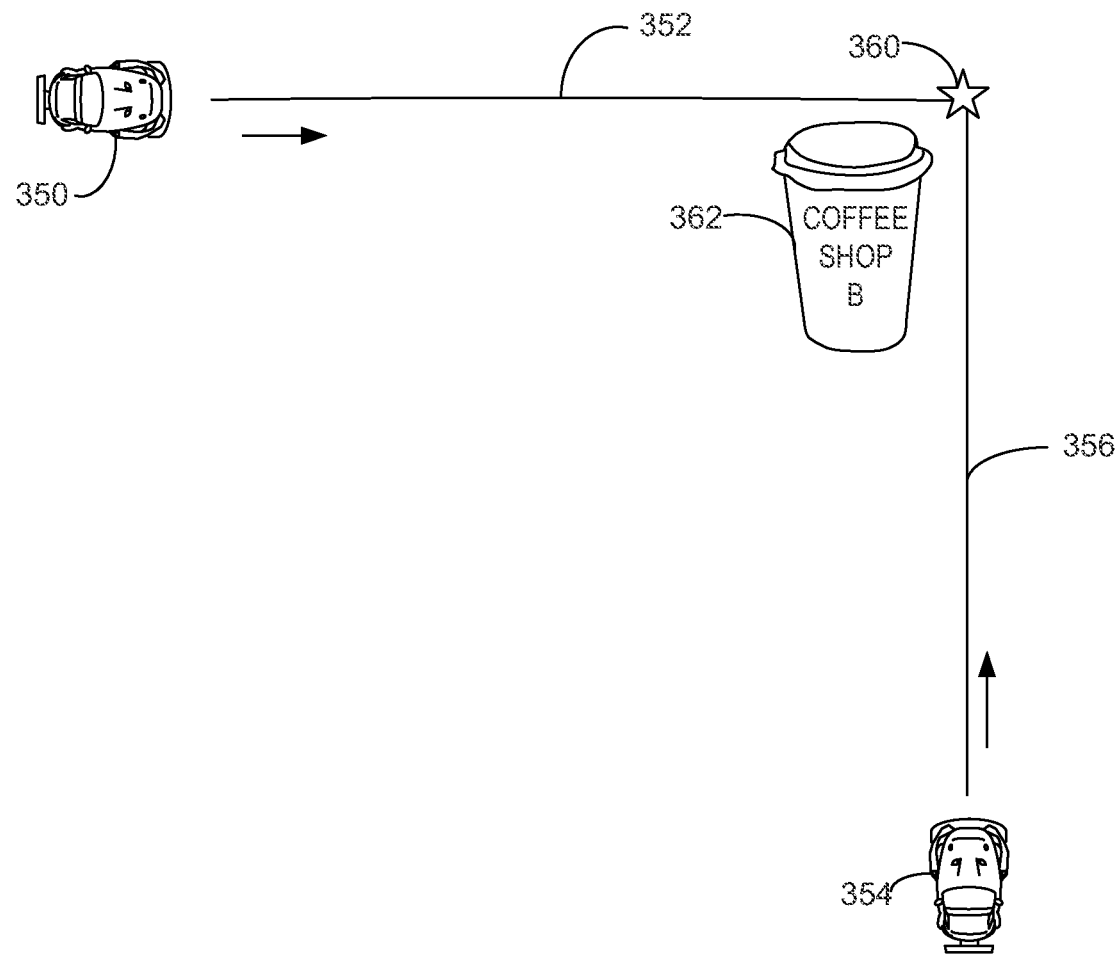
FIG. 5 is a schematic diagram illustrating an example use case of the computer system including a personal agent program of FIG. 1.

In another example use case, and with reference to FIG. 5, user computing device 12 is a mobile communication device and user 14 is in a car 350 that is traveling in a directional trajectory 352. User 14 has notified the personal agent program 10 that the user would like to receive recommendations for coffee shops. The user has also provided the personal agent program 10 with authorization to monitor the user's calendar activity 42' in the calendar program 42, location via the location activity 46' in the mobile device location tracking program 46, and social networking activity 60' in the social networking program 60 that resides on another user computing device 54. By examining the user's social networking activity 60', the personal agent program determines that the user 14 has a friend 15 with whom the user frequently meets for drinks or food.

The user's friend 15 is in a car 354 that is traveling in a directional trajectory 356. Friend 15 is carrying her friend computing device 55 which is also a mobile communication device. Friend 15 has also authorized the personal agent program 10 to monitor her friend activity 57 in a calendar program, mobile device location tracking program, and social networking program on her friend computing device 55.

By monitoring the locations from the user's mobile communication device, the personal agent program 10 determines that the user is traveling in directional trajectory 352. Similarly, by monitoring the locations from the friend's mobile communication device, the personal agent program 10 determines that the friend is traveling in directional trajectory 354. The personal agent program 10 extrapolates from the directional trajectories 352, 354 and determines that the directional trajectories will intersect at an intersecting location 360. The personal agent program also estimates that the user 14 in car 350 will arrive at the intersecting location 360 at approximately 12:42 pm, and the friend 15 in car 354 will arrive at the intersecting location at approximately 12:44 pm.

The personal agent program checks the calendar program 42 of the user 14 and the calendar program of the friend 15 to see if the user and friend are available within a time period that includes the approximate time that the user and friend will arrive at the intersecting location 360. In the present example, the time period is 15 minutes, it will be appreciated that other time periods may be used, such as 5 minutes, 30 minutes, 1 hour or any other suitable time period.

Based on the information determined above, the personal agent program 10 sends requests to the recommendation server 66 for recommendations for coffee shops within a threshold distance of the intersecting location 360, such as one block. Other threshold distances may also be used, such as 3 blocks, 10 blocks or other suitable distances. The recommendation server returns a recommendation to user 14 that the user and friend 15 meet at Coffee Shop B 362 that is located one half block from the intersecting location 360. The recommendation may notify the user 14 that friend 15 is expected to be at intersecting location 360 at approximately 12:44 pm, or 2 minutes after the user is expected to arrive at the intersecting location. The recommendation may also include a coupon, such as a group discount coupon, that provides an incentive for the user 14 and friend 15 to meet at Coffee Shop B 362. If the friend 15 has provided the appropriate permissions, the personal agent program 10 or recommendation server 66 may send the recommendation to the friend computing device 55.

Figure 6:
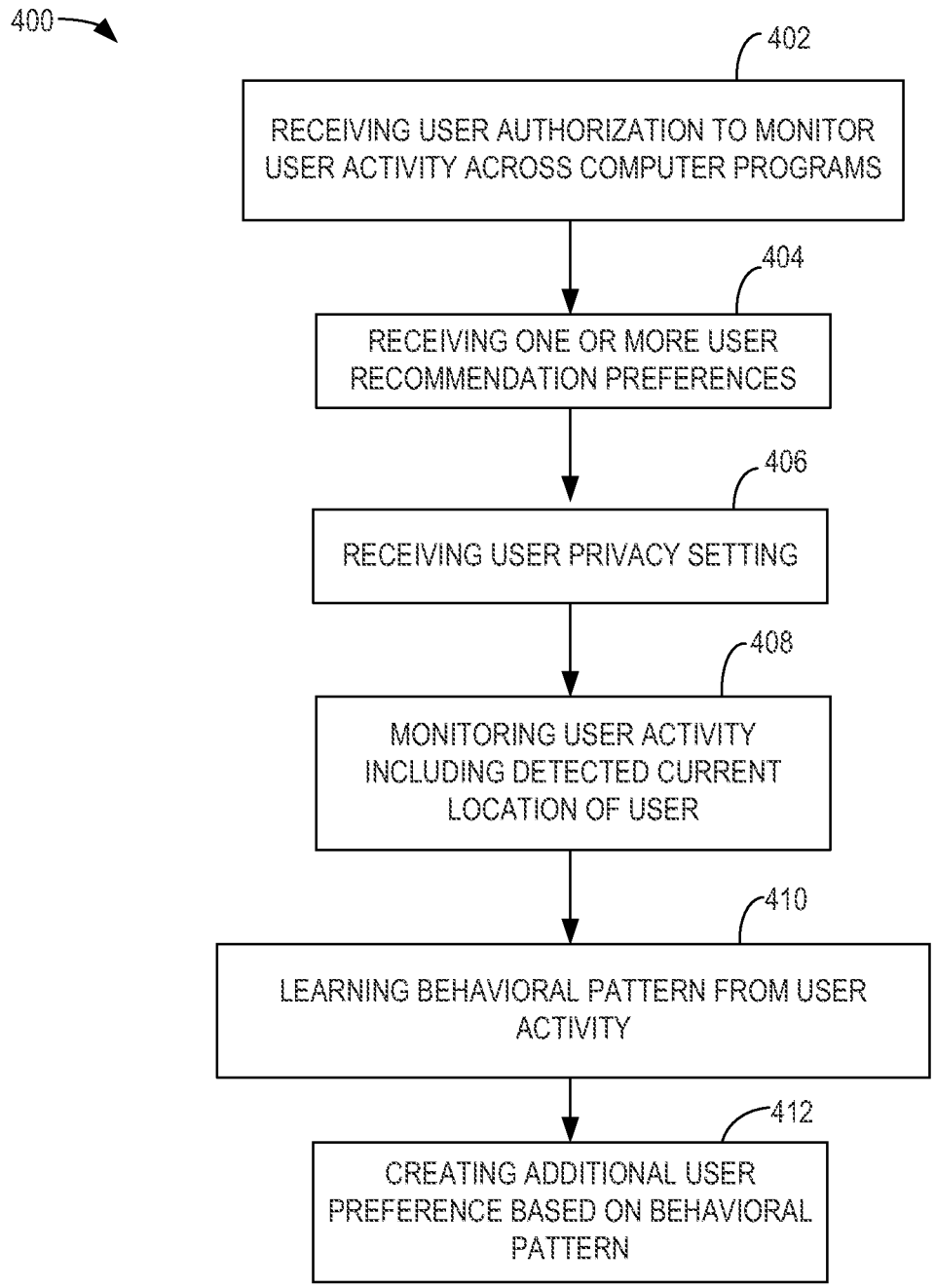
FIG. 6 is a diagram illustrating one embodiment of a method for retrieving recommendations on behalf of a user.

With reference now to FIG. 6, a diagram illustrates a method 400 for retrieving recommendations on behalf of a user according to one embodiment of the present disclosure. The method may be performed using the software and hardware components of the personal agent program 10 and user computing device 12 described above and shown in FIG. 1, or using other suitable components.

At 402 the method includes receiving a user authorization to monitor user activity across a plurality of computer programs used by the user on a user computing device and one or more other user computing devices. As noted above, the plurality of computer programs may include, but are not limited to, an email program, a calendar program, a telephone/messaging program, a mobile device location tracking program, a browser program, a map program, or a social networking program. The user computing device may also be a GPS-enabled mobile computing device.

At 404 the method includes receiving one or more user recommendation preferences indicating product or service recommendations that the user would like to receive from recommendation server. At 406 the method may include receiving a user privacy setting indicating an examine-only category of the user activity that the user authorizes the personal agent program to examine from the plurality of computer programs but not share externally. The user privacy setting may also indicate a sharing-authorized category of the user activity that the user authorizes the personal agent program to send to the recommendation server with the request for the recommendation.

At 408 the method includes monitoring the user activity with the plurality of computer programs according to the user authorization. In one example, the user activity may include a detected current location of the user, in another example, monitoring the user activity may include selectively activating or accessing at least one of the plurality of computer programs based on computing an expected value of information that may be gleaned from the user activity. At 410 the method includes learning a behavioral, pattern from the user activity. At 412 the method may also include creating an additional user preference based on the behavioral pattern from the user activity.

Figure 7:
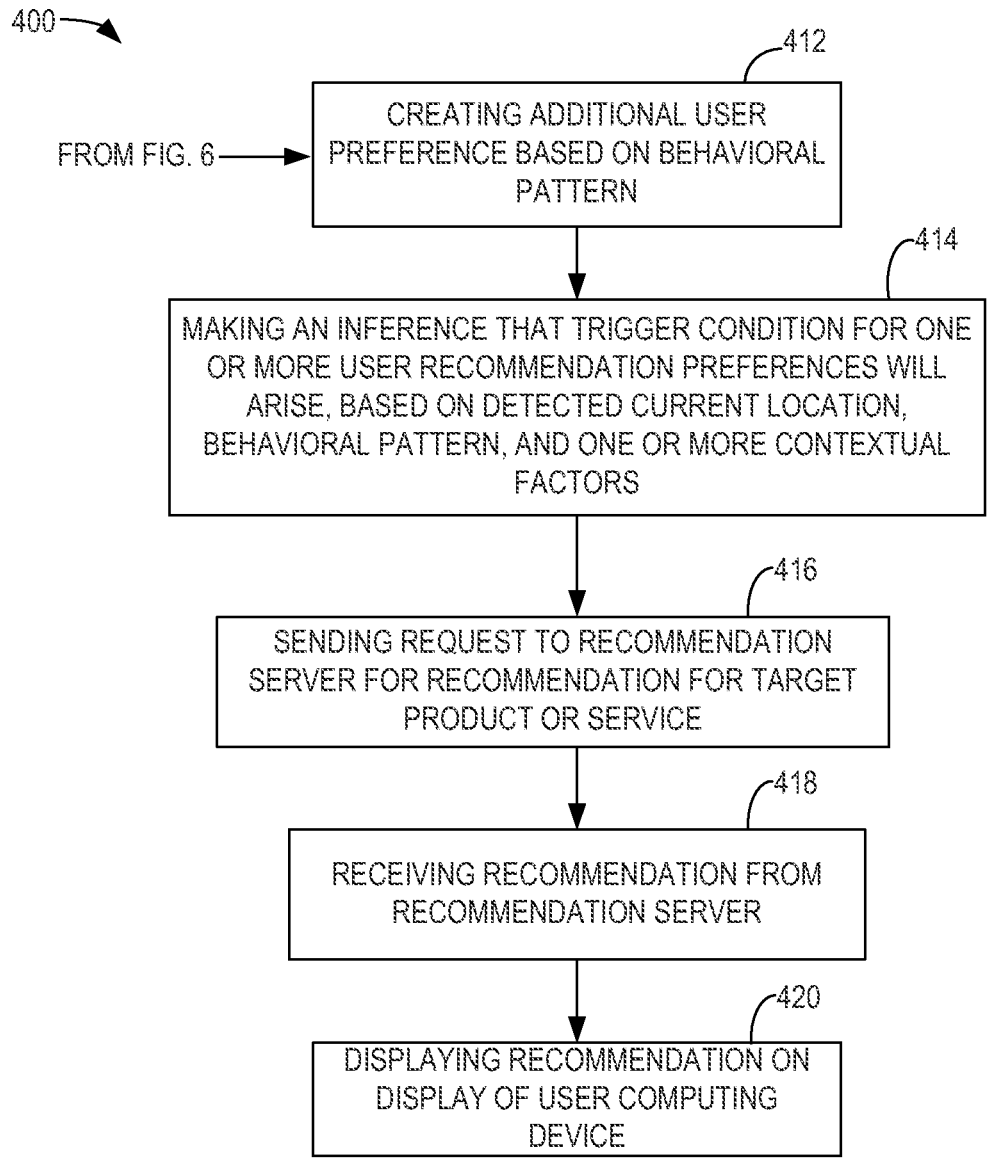
FIG. 7 is a continuation of the diagram of FIG. 6.

Turning now to FIG. 7, at 414 the method may include making an inference that a trigger condition for one or more of the user recommendation preferences will arise, based on the detected current location of the user, the behavioral pattern of the user, and one or more contextual factors. The contextual factors may include, but are not limited to, a date, a day of a week, a time of day, or a time period that the user computing device has been in the detected current location.

At 416 the method includes sending a request to the recommendation server for a recommendation for a target product or service according to the one or more user recommendation preferences. At 418 the method includes receiving the recommendation from the recommendation server. At 420 the method includes displaying the recommendation on a display associated with the user computing device.

Using the systems and methods described above, user activity in a variety of computer programs on one or more computer devices may be passively monitored to the extent expressly authorized by the user, and user behavioral patterns may be learned therefrom. Based on these behavioral patterns, recommendations may be conveniently retrieved for products and services in which the user has expressed a preference, or in which such a preference has been inferred. In this manner, the needs and desires of the user may be proactively anticipated by the systems and methods described herein.

Regarding the software and hardware operating environments described herein, it will be appreciated that the terms "module," "program," and "engine" have been used to describe software components that are implemented by processors of the various computing hardware devices described herein, to perform one or more particular functions. The terms "module," "program," and "engine" are meant to encompass individual or groups of executable files, data files, libraries, drivers, scripts, database records, etc.

It will also be understood that the term "user computing device" may include personal computers, laptop devices, mobile communication devices, tablet computers, home entertainment computers, gaming devices, smart phones, or various other computing devices. Further, the processor and memory may be integrated in a common integrated circuitry, as a so-called system on a chip in some embodiments, and the mass storage may be a variety of non-volatile storage devices, such as a hard drive, firmware, read only memory (ROW, electronically erasable programmable read only memory (EEPROM), FLASH memory, optical drive, etc. Media may be provided for these computing devices, which contains stored instructions that when executed by these computing devices causes the devices to implement the methods described herein. These media may include CD-ROMS, DVD-ROMS, and other media.

It is to be understood that the example embodiments, configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A user computing device for retrieving recommendations on behalf of a user, comprising:
   a processor of the user computing device executing a personal agent program, the personal agent program comprising:
      a monitoring engine executed by the processor of the user computing device and configured to:
         monitor user activity with a plurality of computer programs according to a user authorization, the user activity including a detected current location of and direction of travel of the user and calendar activity of the user, the monitoring engine being configured to learn a behavioral pattern from the user activity; and receive notifications of monitored friend activity of a friend using a friend computing device, the friend activity including a detected current location of and direction of travel of the friend and calendar activity of the friend; and a recommendation engine executed by the processor of the user computing device and configured to:

estimate that the user and the friend will approach an intersecting location within a predetermined window of time, based on the respective detected current locations and directions of travel of the user and the friend;

determine that the user and the friend are available to meet in the predetermined time window based on calendar information;

send a request to a recommendation server for a recommendation for a target service offered at a service location within a threshold distance of the intersecting location, which can facilitate a meeting between the user and the friend;

receive the recommendation from the recommendation server, the recommendation including a recommended service offered at the service location; and display the recommendation to meet the friend at the service location on a display associated with the user computing device.

2. The user computing device of claim 1, wherein a user privacy setting specifies a sharing-authorized category of the user activity that the user authorizes the personal agent program to send to the recommendation server with the request for the recommendation.

3. The user computing device of claim 1, wherein:
the monitoring engine is configured to:
determine that the user and a friend are traveling in directional trajectories that will intersect at an intersecting location.

4. The user computing device of claim 1, wherein the plurality of programs includes an email program, a calendar program, a telephone/messaging program, a mobile device location tracking program, a browser program, a map program, or a social networking program.

5. The user computing device of claim 1, wherein the monitoring engine is further configured to dynamically monitor the user activity by selectively activating or accessing at least one of the plurality of computer programs based on computing an expected value of information that is gleaned from the user activity.

6. The user computing device of claim 1, wherein the monitoring engine is configured to learn the behavioral pattern of the user by receiving aggregate behavioral patterns from the recommendation server, and examining the user activity in the computer programs for user activity that matches the aggregate behavioral patterns within a threshold degree.

7. The user computing device of claim 1, wherein the monitoring engine is configured to create a user recommendation preference based on the behavioral pattern from the user activity.

8. A method for retrieving recommendations on behalf of a user, comprising:
displaying a recommendation graphical user interface on a display of a user computing device;

monitoring user activity with a plurality of computer programs according to a user authorization, the user activity including a detected current location of and direction of travel of the user and calendar activity of the user;

learning a behavioral pattern from the user activity;

receiving notifications of monitored friend activity of a friend using a friend computing device, the friend activity including a detected current location of and direction of travel of the friend and calendar activity of the friend;

estimating that the user and the friend will approach an intersecting location within a predetermined window of time, based on the respective detected current locations and directions of travel of the user and the friend;

determine that the user and the friend are available to meet in the predetermined time window based on calendar information;

sending a request to a recommendation server for a recommendation for a target service offered at a service location within a threshold distance of the intersecting location, which can facilitate a meeting between the user and the friend;

receiving the recommendation from the recommendation server, the recommendation including a recommended service offered at the service location; and displaying the recommendation to meet the friend at the service location on a display associated with the user computing device.

9. The method of claim 8, wherein a user privacy setting specifies a sharing-authorized category of the user activity that the user authorizes the personal agent program to send to the recommendation server with the request for the recommendation.

10. The method of claim 8, wherein the user computing device is a location-aware mobile computing device.

11. The method of claim 8, wherein the plurality of programs includes an email program, a calendar program, a telephone/messaging program, a mobile device location tracking program, a browser program, a map program, or a social networking program.

12. The method of claim 8, wherein monitoring the user activity with the plurality of computer programs further comprises selectively activating or accessing at least one of the plurality of computer programs based on computing an expected value of information that is gleaned from the user activity.

13. The method of claim 8, wherein learning a behavioral pattern includes receiving aggregate behavioral patterns from the recommendation server, and examining the user activity in the computer programs for user activity that matches the aggregate behavioral patterns within a threshold degree.

14. The method of claim 8, further comprising creating a user recommendation preference based on the behavioral pattern from the user activity.

15. A user computing device, comprising:
a processor of the user computing device executing a personal agent program, the personal agent program comprising:
a monitoring engine executed by the processor of the user computing device and configured to:
monitor user activity with a plurality of computer programs according to a user authorization, the user activity including a detected current location of and direction of travel of the user and calendar activity of the user, the monitoring engine being configured to learn a behavioral pattern from the user activity; and receive notifications of monitored friend activity of a friend using a friend computing device, the friend activity including a detected current location of and direction of travel of the friend and calendar activity of the friend; and a recommendation engine executed by the processor of the user computing device and configured to:

estimate that the user and the friend will approach an intersecting location within a predetermined window of time, based on the respective detected current locations and directions of travel of the user and the friend;

determine that the user and the friend are available to meet in the predetermined time window based on calendar information;

send a request to a recommendation server for a recommendation for a target service offered at a service location within a threshold distance of the intersecting location, which can facilitate a meeting between the user and the friend;

receive the recommendation from the recommendation server, the recommendation including a recommended service offered at the service location, the recommendation generated according to one or more of one or more user recommendation preferences and the behavioral pattern of the user;

take an action on behalf of the user with respect to an opportunity occurring in the future; and display the recommendation and information related to the opportunity on a display associated with the user computing device.

* * * * *